US012591150B2

(12) United States Patent
Gilbert

(10) Patent No.: US 12,591,150 B2
(45) Date of Patent: Mar. 31, 2026

(54) EYEWEAR FRAME

(71) Applicant: Essilor International,
Charenton-le-Pont (FR)

(72) Inventor: Cedric Gilbert, Charenton-le-Pont (FR)

(73) Assignee: Essilor International,
Charenton-le-Pont (FR)

( * ) Notice: Subject to any disclaimer, the term of this
patent is extended or adjusted under 35
U.S.C. 154(b) by 525 days.

(21) Appl. No.: 17/997,606

(22) PCT Filed: May 18, 2021

(86) PCT No.: PCT/EP2021/063124
§ 371 (c)(1),
(2) Date: Oct. 31, 2022

(87) PCT Pub. No.: WO2021/233907
PCT Pub. Date: Nov. 25, 2021

(65) Prior Publication Data
US 2023/0221584 A1    Jul. 13, 2023

(30) Foreign Application Priority Data
May 18, 2020    (EP) ..................................... 20305512

(51) Int. Cl.
*G02C 11/00*          (2006.01)
*H04B 1/3827*        (2015.01)
*H04B 5/24*          (2024.01)

(52) U.S. Cl.
CPC ............. *G02C 11/10* (2013.01); *H04B 1/385*
(2013.01); *H04B 5/24* (2024.01); *H04B*
*2001/3866* (2013.01)

(58) Field of Classification Search
CPC . G02C 11/10; H04B 5/24; H04B 5/72; H04B
1/385; H04B 2001/3866
See application file for complete search history.

(56) References Cited

U.S. PATENT DOCUMENTS 6,930,987 B1 *    8/2005    Fukuda ................. H04W 88/06
                                                            370/328
7,971,994 B2      7/2011    Blum et al.
                            (Continued)

FOREIGN PATENT DOCUMENTS

EP           3 157 173 A1      4/2017
WO     WO-2010093997 A1 *    8/2010    ............. B60L 53/12
WO     WO 2016/168409 A1    10/2016

OTHER PUBLICATIONS

Alessandra Flammini et al., Clock Synchronization of Distributed,
Real-time, Industrial Data Acquisition Systems, 2010, pp. 41-62
[online], [retrieved Mar. 28, 2025], retrieved from Internet <URL:
https://cdn.intechopen.com/pdfs/12259/InTech-Clock_synchronization_
of_distributed...systems.pdf>. (Year: 2010).*

(Continued)

*Primary Examiner* — James R Greece
(74) *Attorney, Agent, or Firm* — Oblon, McClelland,
Maier & Neustadt, L.L.P.

(57) ABSTRACT

An eyewear frame (10) comprising: —a central portion (12)
configured to receive at least one optical lens (14a,
14 b), —a first temple (16a) having a first embedded
electronic device (18a) and a first battery (20a), —a second
temple (16b) having a second embedded electronic device
(18b) and a second battery (20b), the first temple (16a) is
pivotably fixed to a first end (22a) of the central portion (12)
and second temple (16b) is pivotably fixed to a second end
(22b) of the central portion (12), wherein the first electronic
and the second electronic devices (18a, 18b) are configured
to communicate in a wireless manner, and the first and
second electronic devices (18a, 18b) comprise each a close-
range communication system (24a, 24b) configured to syn-
chronize the first and the second electronic devices (18a,
18b).

15 Claims, 2 Drawing Sheets

(56) References Cited

U.S. PATENT DOCUMENTS

| | | | | |
|---|---|---|---|---|
| 8,368,540 | B2 * | 2/2013 | Perkins | H04B 5/24 |
| | | | | 455/426.2 |
| 8,432,260 | B2 | 4/2013 | Talty et al. | |
| 8,867,993 | B1 * | 10/2014 | Perkins | H04B 5/263 |
| | | | | 455/41.1 |
| 8,964,298 | B2 * | 2/2015 | Haddick | G02B 27/017 |
| | | | | 359/630 |
| 9,229,248 | B2 * | 1/2016 | Kokonaski | G02C 7/083 |
| 9,294,566 | B2 * | 3/2016 | Giampaolo | G06F 16/178 |
| 9,838,086 | B2 * | 12/2017 | Dettmann | H04B 5/72 |
| 9,910,298 | B1 | 3/2018 | Sales et al. | |
| 10,218,114 | B2 * | 2/2019 | Tham | H02J 7/0045 |
| 10,302,970 | B2 * | 5/2019 | Toner | G02C 7/04 |
| 10,390,205 | B2 | 8/2019 | Mohaupt et al. | |
| 10,571,715 | B2 * | 2/2020 | Rizzo, III | G02C 5/001 |
| 10,613,355 | B2 * | 4/2020 | Blum | G02B 27/017 |
| 11,934,038 | B1 * | 3/2024 | Ben-Haim | G02C 3/006 |
| 2014/0168392 | A1 * | 6/2014 | Kang | H04N 13/398 |
| | | | | 348/56 |
| 2016/0179223 | A1 * | 6/2016 | Konanur | H04B 5/72 |
| | | | | 345/179 |
| 2016/0252728 | A1 | 9/2016 | Mack et al. | |
| 2017/0180915 | A1 | 6/2017 | Adhikari | |
| 2017/0223163 | A1 | 8/2017 | Li et al. | |
| 2018/0324177 | A1 * | 11/2018 | Wang | G06F 16/532 |
| 2019/0278110 | A1 | 9/2019 | Howell et al. | |
| 2021/0099639 | A1 * | 4/2021 | Bartow | H04N 23/45 |
| 2022/0057657 | A1 * | 2/2022 | Blum | G02C 7/101 |

OTHER PUBLICATIONS

Nasar Hossein Motlagh, Near Field Communication (NFC) A Technical Overview, 2012, pp. 1-87 [online], [retrieved Mar. 29, 2025], retrieved from the Internet <URL: https://www.researchgate.net/publication/283498836_Near_Field_Communication_NFC_-_A_technical_Overview>. (Year: 2012).*

Oliver Amft et al., Making Regular Eyeglasses Smart, 2015, pp. 32-43 [online], [retrieved Mar. 27, 2025], retrieved from the Internet <URL: https://ieeexplore.ieee.org/stamp/stamp.jsp?tp=&arnumber=7140688>. (Year: 2015).*

Nallapaneni Manoj Kumar et al., Wearable Smart Glass: Features, Applications, Current Progress and Challenges, 2018, pp. 577-582 [online], [retrieved Mar. 27, 2012], retrieved from the Internet <URL: https://www.researchgate.net/publication/327051350_Wearable_Smart_Glass_Features_...and_Challenges>. (Year: 2018).*

Laura Evans, How Do I Measure My Glasses?, 2019, pp. 1-4 [online], [retrieved Mar. 28, 2025], retrieved from the Internet <URL: https://www.allaboutvision.com/eyewear/eyeglasses/fit/measuring-glasses/>. (Year: 2019).*

Ricky Harewood, What is ZigBee and What Devices Can it Work With Within the Smart Home?, 2019, pp. 1-11 [online], [retrieved Mar. 31, 2025], retrieved from the Internet <URL: https://www.smarthome.news/news/other-systems/what-is-zigbee-and-compatible-smart-home-devices>. (Year: 2019).*

Andrea Bacioccola: "Bluetooth Secure Simple Pairing Using NFC Application Document NFC," *NCF Forum*, Jan. 9, 2014, XP055742736, 39 pages.

International Search Report mailed on Jun. 23, 2021 in PCT/EP2021/063124 filed on May 18, 2021 (5 pages).

Written Opinion mailed on Jun. 23, 2021 in PCT/EP2021/063124 filed on May 18, 2021 (11 pages).

* cited by examiner

EYEWEAR FRAME

TECHNICAL FIELD

The disclosure relates to an eyewear frame comprising embedded electronic devices inside the temples of the eyewear frame and a method for synchronizing said embed electronic devices.

BACKGROUND

It is known to provide a smart frame where lenses are electro-active and needs to host an electronic device that drives these lenses. Both lenses need to receive a symmetrical command at the same time to provide the same optical functionality.

In the case of a specific architecture called "cloned temple", each side of the frame, i.e. the temple or the hinge hosts an electronic device electrically driving one lens. Each electronic device is linked to the lens by physical means, i.e. wires, flex circuit, direct soldering or dry contact. Also, both electronic devices must be synched in order to provide simultaneously the same command to each lens.

Most of smart frame equipment embed a physical media, i.e. wire of flex circuit over the nose bridge, connecting physically both electronics devices located inside the temples to enable communication between these parts.

In the specific case of a wire or flex free architecture, i.e. both electronics devices exchange data through radio waves, these both electronics devices must be synched together first before they exchange data.

A main aspect to solve at the manufacturing step, is to only and solely synchronize the two electronic devices embedded in the same frame, meaning each system needs to have a pairing between the right and left electronic devices for the same frame. Using radio waves renders the synchronization more complex, since radio waves propagate beyond the eyewear, and if there is no specific procedure when synchronizing multiple eyewears, the risk is to pair for instance a right electronic device of a first frame, with a left electronic device of a second frame.

The disclosure proposes an eyewear frame and a synchronization method to overcome this issue and to synchronize only the electronic devices within the same frame.

SUMMARY

To this end, the disclosure proposes an eyewear frame comprising:
a central portion configured to receive at least one optical lens,
a first temple having a first embedded electronic device and a first battery,
a second temple having a second embedded electronic device and a second battery,
the first temple is pivotably fixed to a first end of the central portion and the second temple is pivotably fixed to a second end of the central portion,
wherein the first electronic and the second electronic devices are configured to communicate in a wireless manner,
the first and second electronic devices comprise each a close-range communication system configured to synchronize the first and the second electronic device.

Advantageously, this disclosure provides a simple, autonomous and secure way to sync electronic devices embedded into the temples of the eyewear frame either after a first assembly at production level or after a temple replacement without using an external device or a specific knowledge of the operator. The first and second close-range communication systems are configured to communicate with each other, when brought respectively close to one another, and enable starting a synchronization process between the first and the second electronic devices.

According to further embodiments which can be considered alone or in combination:
the close-range communication systems are radio frequency-based communication systems, for example using a NFC communication protocol; and/or
the close-range communication systems are radio frequency-based communication systems are spaced of at most few millimeters, for example less than 5 mm; and/or
the close-range communication systems are radio frequency-based communication systems are configured to communicate only when the temples are in a closed position; and/or
the electronic devices synchronization, via the close-range communication systems, is based on the first and second electronic devices identities, for example at least a part of MAC address or an unique identifier defining respectively the first and second electronic devices; and/or
the first and the second electronic devices further comprise respectively a medium-range wireless communication system; and/or
a first medium-range wireless communication system is configured to communicated with a second medium-range wireless communication system, when the medium-range wireless communication systems; and/or
the medium-range wireless communication systems comprise each Near-Field Magnetic Induction Communication or radio frequency communication, for example based on the Bluetooth® communication protocol; and/or
the close-range communication systems are configured:
to pair the first and second electronic devices, and
to define among the first or second electronic devices a master and a slave used for the medium-range wireless communication systems; and/or
the eyewear frame comprises a communication activation device configured to activate the close-range communication systems; and/or
the communication activation device comprises at least one motion sensor, the motion sensor is configured to activate close-range radio frequency-based communication systems upon detection of a specific motion pattern; and/or
the communication activation device comprises at least one battery sensor, the battery sensor is configured to activate close-range radio frequency-based communication systems upon detection of a charge of at least one, preferably both, of the first and second batteries.

The disclosure further relates to a method for synchronizing embedded electronic devices of an eyewear frame comprising:
a central portion configured to receive at least one optical lens,
a first temple having a first embedded electronic device and a first battery,
a second temple having a second embedded electronic device and a second battery, the first temple is pivotably fixed to a first end of the central portion and second temple is pivotably fixed to a second end of the central portion, the first electronic and the second electronic devices are configured to communicate in a wireless manner, the first and second electronic devices comprise each a close-range communication system wherein the method comprises:

activating the close-range communication systems, exchanging identifiers of the first and second electronic devices via the close-range communication systems, synchronizing the first and second electronic devices.

Advantageously, bringing the first and the second close-range communication systems close to each other enables a communications between the first and second close-range communication systems and provides a simple and secure way to synch the first and second electronic devices either after a first assembly at production level or after a temple replacement without an external third party device or a specific knowledge of the operator.

According to further embodiments which can be considered alone or in combination:

activating the close-range communication systems is caused at least by the detection of a motion pattern by a mention sensor; and/or activating the close-range communication systems is caused at least by a detection of the charge of the first and/or second battery; and/or activating the close-range communication systems is caused at least by a detection of any sensors embedded into the frame as physical or capacitive or magnetic button, hinge closure detection, light sensor; and/or upon synchronizing the first and second electronic devices the method further comprises defining among the first or second electronic devices a master and a slave.

BRIEF DESCRIPTION OF THE DRAWINGS

Embodiments of the disclosure will now be described, by way of example only, and with reference to the following drawings in which.

DETAILED DESCRIPTION OF THE DISCLOSURE

Figure 1:
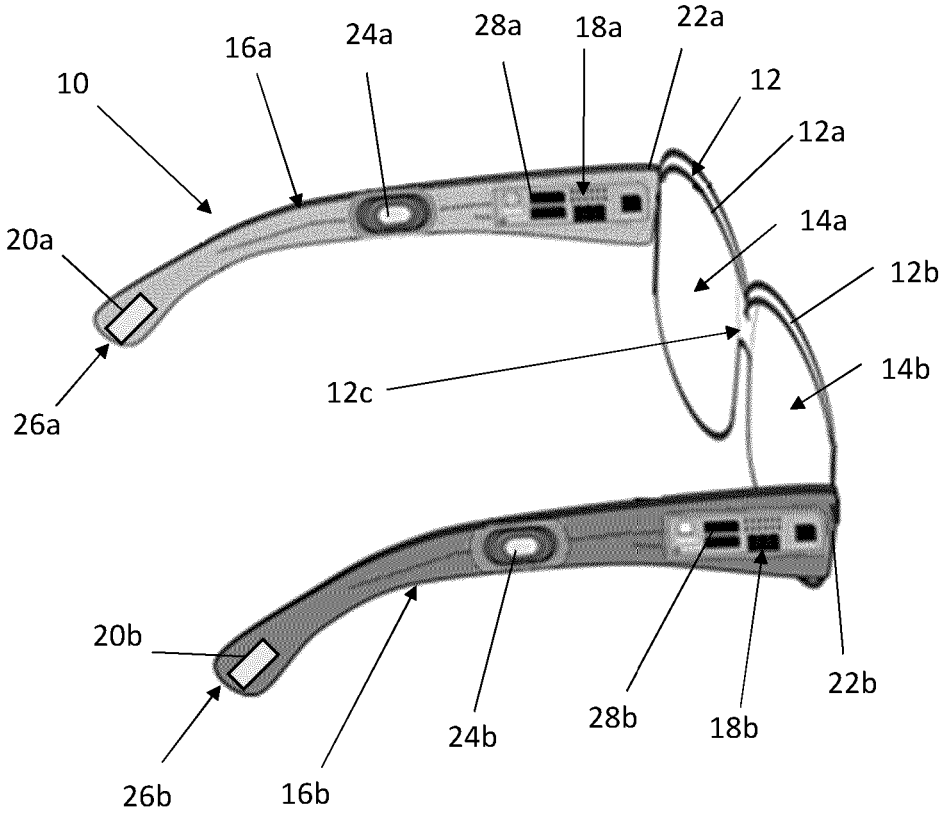
FIG. 1 illustrates a perspective view of an eyewear frame according to the disclosure.

As illustrated on FIG. 1 the disclosure relates to an eyewear frame 10 comprising a central portion 12, a first temple 16a and a second temple 16b.

The central portion 12 is configured to receive at least one, for example two, optical lens 14a, 14b. The optical lens 14a 14b may be active lenses and more precisely ophthalmic lenses. The central portion 12 may comprise a first and a second contour portions 12a, 12b configured to house the first and the second optical lenses 14a, 14b. The first and second contour portions 12a, 12b are linked together by a bridge portion 12c. The first and the second temples 16a, 16b are pivotably fixed onto respective first and second lateral ends 22a, 22b of the central portion 12, the first temple 16a being pivotably fixed to the first lateral end 22a and the second temple 16b being pivotably fixed to the second lateral end 22b.

The first temple 16a comprises a first embedded electronic device 18a and a first battery 20a. The first embedded electronic device 18a comprises a first close-range communication system 24a and a first the medium-range wireless communication system 28a.

The second temple 16b comprises a second embedded electronic device 18b and a second battery 20b. The second embedded electronic device 18b comprises a second close-range communication system 24b and a second the medium-range wireless communication system 28b.

The temples 16a, 16b of the eyewear fame 10 comprises embedded electronic devices 18a, 18b and batteries 20 in such manner the eyewear frame, as a whole, is advantageously a waterproof architecture.

In an embodiment, the first and the second batteries 20a, 20b are embedded in vicinity of the free ends of 26a, 26b of the first and second temples 16a, 16b. The free ends 26a, 26b of the temples correspond to the end of the temple being at the opposite to the temple end pivotably fixed to one end 22a, 22b of the central portion 12. This arrangement enables a better balance of the eyewear frame, once worn by a wearer.

The first electronic and the second electronic devices 18a, 18b are configured to communicate one with another in a wireless manner.

The close-range communication systems 24a, 24b are configured to allow communications when said communications systems 24a, 24b are in contact or quasi-contact. The first and second close-range communications systems are not able to communicate together if the communications range is spaced from a distance larger than the maximal distance communication range, which may for example be 5 mm. Bringing the first and second close-range communication systems in contact or quasi contact makes the communication possible between the first and second close-range communication system. The term quasi-contact means that the electronic devices 18a, 18b may be completely embedded and the temples may have at least one area of contact or an area where portions of each temple 16a, 16b housing the close-range communication systems 24a, 24b are spaced at most of few millimeters, for example less than 5 mm.

In an embodiment, the close-range communication systems 24a, 24b can be radio frequency-based communication systems, for example using a NFC communication protocol. The maximal communication distance of close-range communication systems 24a, 24b using NFC protocol is 10 cm.

The bitragion breadth corresponds to an average distance of 14.5 cm for men and 13, 8 cm for women. The bitragion breadth is the breadth of the head from the right tragion to the left. Tragion is the cartilaginous notch at the front of the ear. The first percentile corresponding to the minimal bitragion breadth is 13.1 cm for men and 12.5 cm for women.

The maximal communication distance of close-range communication systems 24a, 24b using NFC protocol is configured to not be able to communicate when the temples 16a, 16b are in an opened position. The opened position of the temples 16a, 16b corresponds to the position wherein the temples 16a, 16b are parallel and wherein a free end of each temple 16a, 16b is spaced of the central portion 12.

With respect to the open position, a closed position is defined by the temples 16a, 16b being pivoted towards the central portion 12. The free end of each temple 16a, 16b is brought close to the central portion 12, and the temples are in contact or quasi-contact, being spaced by at most few millimeters, for example 5 millimeters.

In an embodiment, the electronic devices 18a, 18b synchronization, via the close-range communication systems 24*a*, 24*b*, is based on the first and second electronic devices 18*a*, 18*b* identities, being the first and second electronic devices 18*a*, 18*b* identifiers, for example at least a part of MAC address or an unique identifier defining respectively the first and second electronic devices 18*a*, 18*b*. The MAC addresses to be exchanged by the close-range communication systems 24*a*, 24*b* may be the MAC addresses of the electronic devices 18*a*, 18*b* or the MAC addresses of the close-range communication systems 24*a*, 24*b*. In an embodiment, the first and the second electronic devices 18*a*, 18*b* further comprise respectively a medium-range wireless communication system 28*a*, 28*b*, and the MAC addresses to be exchanged by the close-range communication systems 24*a*, 24*b* may be the MAC addresses of the medium-range wireless communication system 28*a*, 28*b*.

In an embodiment, the first and the second electronic devices 18*a*, 18*b* further comprise respectively a medium-range wireless communication system 28*a*, 28*b*. To differentiate the close-range communication systems 24*a*, 24*b* from the medium-range wireless communication system 28*a*, 28*b*, the medium-range wireless communication system 28*a*, 28*b* may be able to communicate when the devices 28*a*, 28*b* are spaced by more than few millimeters, for example more than 10 mm. Preferably the medium-range wireless communication system 28*a*, 28*b* may be able to communicate when they are spaced by a few centimeters, for example spaced from each other for a distance above to 10 cm. The first and second medium-range communication systems 28*a*, 28*b* may be able to communicate with each other if they are respectively spaced one from another of about 20 to 30 cm, and even greater distances if the first and second medium-range communication systems 28*a*, 28*b* communicates with each other through Bluetooth® protocol. Said medium-range wireless communication system 28*a*, 28*b* may be configured to communicate one with another when they are each spaced of the magnitude of the width of the head of the wearer.

In a preferred embodiment, the medium-range wireless communication systems 28*a*, 28*b* comprise each Near-Field Magnetic Induction Communication or radio frequency communication, for example based on the Bluetooth® communication protocol.

In an embodiment, the close-range communication systems 24*a*, 24*b* are configured:
  to pair the first and second electronic devices 18*a*, 18*b*, and
  to define among the first or second electronic devices 18*a*, 18*b* a master and a slave used for the medium-range wireless communication systems 28*a*, 28*b*.

In an embodiment, the eyewear frame comprises a communication activation device, embedded in each of the temple 16*a*, 16*b*, configured to activate the close-range communication systems 24*a*, 24*b*. The activation device is an electronic device configured to determine if an activation event has occurred, and upon detection of this activation event enable the close-range communication systems 24*a*, 24*b* to communicate with each other. The activation event may be for example pivoting both temples 16*a*, 16*b* towards the central portion 12 of the frame and/or performing a specific motion pattern holding the frame and/or charging of at least the first and/or the second battery 20*a*, 20*b*. Other activation events could be considered such as the pressure of a mechanical button or the contact with a capacitive button or the activation of a magnetic button.

The communication activation device, upon detection of one of the activation event, enables the close-range communications systems 24*a*, 24*b* to communicate together, for example over a given period of time. This given period of time is sufficient to enable a data exchange between the both close-range communication systems 24*a*, 24*b*. Upon the data exchange, the communication activation device and the close-range communication systems 24*a*, 24*b* may be deactivated. In such a manner, the electronic devices 18*a*, 18*b* synchronization is also very low power as the close-range communication systems 24*a*, 24*b* are only activated for the given period of time necessary to proceed to the data exchange. It is particularly interesting to have low power devices when said devices are embedded.

Figure 3:
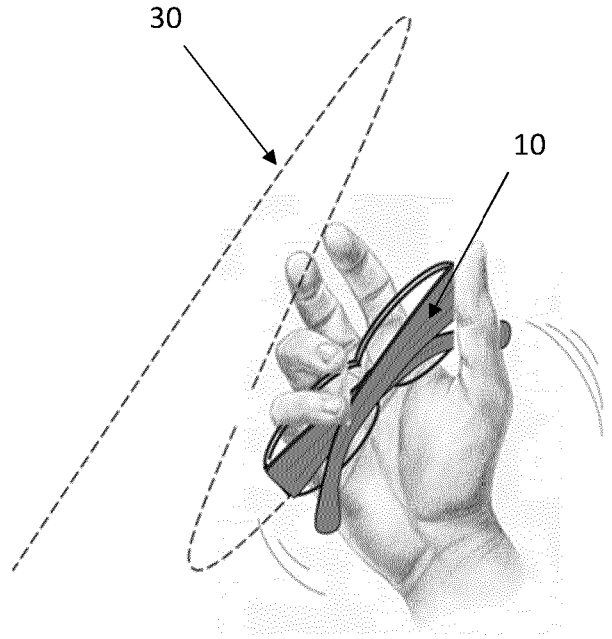
FIG. 3 illustrates a perspective view of a motion pattern while carrying an eyewear frame according to the disclosure.

In an embodiment, the communication activation device comprises at least one motion sensor, the motion sensor is configured to activate close-range radio frequency-based communication systems 24*a*, 24*b* upon detection of a specific motion pattern 30 (shown in FIG. 3). The motion sensor may be an accelerometer, a gyroscope, or any passive/active motion sensor able to recognize a motion pattern.

In an embodiment, the communication activation device comprises at least one battery sensor, the battery sensor is configured to activate close-range radio frequency-based communication systems 24*a*, 24*b* upon detection of a charge of at least one, preferably both, of the first and second batteries 20*a*, 20*b*.

The disclosure further relates to a method for synchronizing embedded electronic devices 18*a*, 18*b* of an eyewear frame 10 comprising:
  a central portion 12 configured to receive at least one optical lens 14*a*, 14*b*,
  a first temple 16*a* having a first embedded electronic device 18*a* and a first battery 20*a*,
  a second temple 16*b* having a second embedded electronic device 18*b* and a second battery 20*b*,
the first temple 16*a* is pivotably fixed to a first end 22*a* of the central portion 12 and second temple 16*b* is pivotably fixed to a second end 22*b* of the central portion 12,
the first electronic and the second electronic devices 18*a*, 18*b* are configured to communicate in a wireless manner,
the first and second electronic devices 18*a*, 18*b* comprise each a close-range communication system 24*a*, 24*b*
wherein the method comprises:
  activating the close-range communication systems 24*a*, 24*b*,
  exchanging identifiers of the first and second electronic devices 18*a*, 18*b* via the close-range communication systems 24*a*, 24*b*,
  synchronizing the first and second electronic devices 18*a*, 18*b*.

Advantageously, the method provides a simple and secure way to sync the electronic devices 18*a*, 18*b* embedded into both temples 16*a*, 16*b* either after a first assembly at production level or after a temple replacement without an external device or a specific knowledge of the operator.

In an embodiment, activating the close-range communication systems 24*a*, 24*b* is caused at least by the detection of a motion pattern 30 by a motion sensor.

In an embodiment, upon synchronizing the first and second electronic devices 18*a*, 18*b*, the method further comprises defining among the first or second electronic devices 18*a*, 18*b* a master and a slave.

Prior to allowing each electronic device 18*a*, 18*b* to be synchronized one with another, the first medium-range wireless communication system 28*a* of the first electronic device 18*a* and the second medium-range wireless communication system 28*b* of the second electronic device 18*b* must know each other's identifiers.

In the case of two medium-range wireless communication systems 28a, 28b which have no human interface, and which are not aware of each other identifiers, it is advantageous to provide them each other identifiers prior to pairing.

The solution proposed here is a method that allows for both first and second electronic devices 18a, 18b of the same frame to be coupled together without knowing each other identifiers in a secure way and with an easy and limited human interaction.

The embedded first and second electronic devices 18a, 18b comprise each an additional radio protocol device being close-range communication systems 24a, 24b designed to allow identifier exchange of the both first and second electronic devices 18a, 18b. These close-range communication systems 24a, 24b are configured to allow identifiers exchanges only when being in contact or quasi-contact, for example less than 5 mm apart. These close-range communication systems 24a, 24b may use NFC (Near Field Communication) technology.

The medium-range wireless communication systems 28a, 28b are able to communicate together from a farther distance than the close-range communication systems 24a, 24b, for example greater than or equal to 10 cm, requiring contact or quasi contact to be able to communicate.

The identifiers exchanged between the close-range communication systems 24a, may be the MAC address of the embedded electronic devices 18a, 18b, the close-range communication systems 24a, 24b or the medium-range wireless communication systems 28a, 28b, or any unique identifier through the close-range radio protocol, such as NFC, respective first and second electronic devices 18a, 18b.

Figure 2:
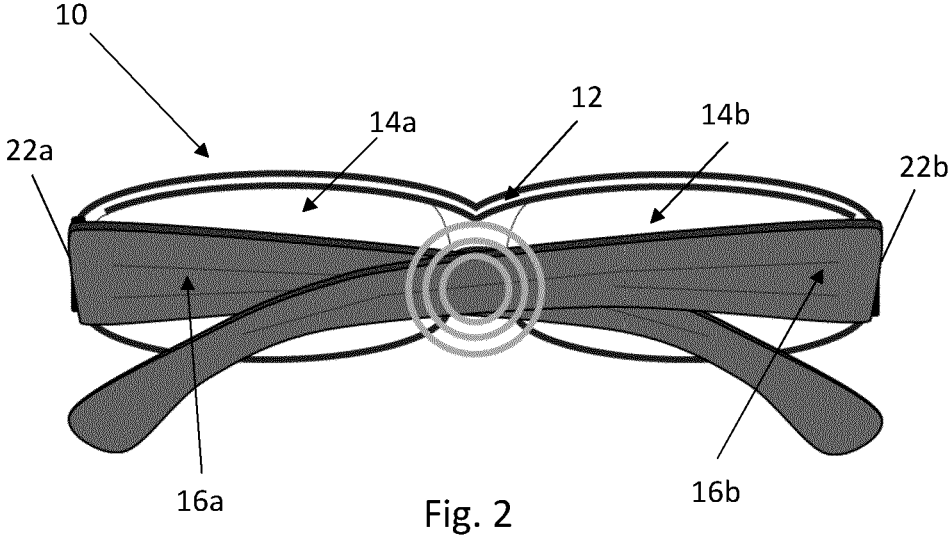
FIG. 2 illustrates a rear view of an eyewear frame according to the disclosure.

In order to start the method of the disclosure, a person may just rotate each temple 16a, 16b of the eyewear frame 10 towards the central portion 12 (shown in FIG. 2). This rotating movement of the temples 16a, 16b towards the central portion 12 of the eyewear frame 10 may be referred to as closing the temples 16a, 16b. Once the temples 16a, 16b are closed, the person may reproduce a motion pattern 32 holding the eyewear frame 10 to activate the close-range communication systems 24a, 24b thanks to communication activation devices being embedded in each temple 16a, 16b. The motion pattern 32 may be for example shaking, rotating, or any other movement of the eyewear frame 10 that a motion sensor such as a gyroscope or an accelerometer may sense.

Alternatively, the communication activation device may be configured to activate the close-range communication systems 24a, 24b upon charging at least one of, for example both of, the first and second battery 20a, 20b.

In order to avoid random synchronization of the first and second electronic devices 18a, 18b, a synchronization may occur solely once temples 16a, 16b, mounted on the central portion 12, are closed and that a motion pattern 30 is performed, for example, by the person holding the eyewear frame 10. A double activation step may be required to enable the communication the close-range communication systems 24a, 24b by either:

closing each temple 16a, 16b towards the central portion 12 and reproducing a motion pattern 30, and/or
   closing each temple 16a, 16b towards the central portion 12 and charging at least one of the first and the second batteries 20a, 20b.

Having a particular multi-processing method makes pairing between electronic devices 18a, 18b more secure and avoids the pairing of electronic devices 18a, 18b belonging to different eyewear frames 10. The synchronization is optimally secured while remaining extremely user friendly to any person manipulating the eyewear frame 10 during the manufacturing and assembly steps.

The NFC identifiers exchange requires that both temples 16a, 16b be as close as possible one from the other. The close-range communication systems 24a, 24b are embedded in a clever manner into the first and second temples 16a, 16b so as to be in quasi contact when the temples 16a, 16b are closed. In such manner, the temples 16a, 16b are stacked one onto another on their respective central portion, where is embedded the close-range communication systems 24a, 24b. Said closing and stacking enable the first and second temples 16a, 16b to be centered one with another in the area of the close-range communication systems 24a, 24b. Said stacking and centering enable to shorten the distance between the two close-range communication systems 24a, 24b.

The communication between the close-range communication systems 24a, 24b may only be allowed by direct contact between temples. Once the close-range communication systems 24a, 24b are activated and enabled to communicate, said close-range communication devices 24a, 24b communicate to each other their identifier. The purpose here is to prevent unwanted synchronization, device malfunction or device hacking by a third party. So, this multi-step synchronization method enables a simple way to provide both a proper usage of the eyewear frame and to guarantee its security.

Another way to activate the synchronization of the first and second electronic devices 18a, 18b may depend on preexisting implemented functionalities. The smart eyewear frames 10 already embed a motion sensor which may be an IMU, inertial movement unit, for instance at least an accelerometer. A specific new usage regarding a pre-existing component imply no additional costs.

In an embodiment, the eyewear frame also embeds at least one human machine interface such as at least one button. The at least one button type may be mechanical or capacitive or magnetic. After closing the first and second temples 16a, 16, the first and second electronic device 18a, 18b could be synchronized based on a pressure and a release of the pressure of the at least one mechanical button. If the at least one button is capacitive, a contact with a finger for a given period of time, for example lasting at least 3 seconds would enable the synchronization of the first and second temples 16a, 16b. In a similar manner a magnetic button could be activated by a magnet at proximity. The magnet could be located in the eyewear box or any other support at specific location. This action related to the pression or the contact of a button is very simple, is extremely comprehensive and easy to be performed by the wearer.

Such simple temples synchronization methods ease the replacement of at least one temple 16a, 16b of the eyewear frame 10 while still enabling the synchronization of the electronic device 18a, 18b of the at least one replaced temple 16a, 16b.

After each temple replacement, the electronic devices 18a, 18b may proceed to a synchronization. To reassure the frame user that he has correctly done the method, a signal through an actuator may be sent, for example a short light signal such as a led, a vibration, an audio signal, or a specific display within a smartphone application connected to the frame or any means that confirms the frame user the synchronization is done and the eyewear frame 10 is working properly.

In a preferred embodiment, the communication between the close-range communication systems 24a, 24b is limited to a given period of time to limit power consumption. This limited period of time may prevent possible malfunctions or security breach.

In an embodiment, to limit power consumption, the close-range communication exchange is only allowed when both embed electronic devices 18a, 18b are not synched.

Close-range communication systems 24a, 24b may exchange their respective Bluetooth Low Energy® identifiers. The Bluetooth Low Energy® topology imposes to define between the first and second electronic devices 18a, 18b at least a master device and a slave device.

At a first boot, neither the first nor second electronic devices 18a, 18b knows which has to be the master or the slave. After the identifiers exchange, master and slave roles attribution could be based on a comparison between identifiers numbers where the slave could be the lowest number and master the highest number. Following the identifiers numbers exchange, each electronic device 18a, 18b knows its own role, either master or slave, in the Bluetooth Low Energy® communication procedure.

Every first and second electronic devices 18a, 18b embedded into the first and second temples 16a, 16b may implement a firmware which is able to act either as a master or a slave. The same firmware is used for both of the first and second embed electronic devices 18a, 18b.

In an embodiment, the Bluetooth Low Energy® slave or master role may be pre-defined into the firmware, but this means that for example each right temple would be the master and left temple would be the slave. In another embodiment, each left temple would be the master and right temple would be the slave. The self-determination of the Bluetooth Low Energy® role over the electronic devices 18a, 18b allows more flexibility at a lowest cost for managing the life cycle of the eyewear frame 10 and more precisely the first and second temples 16a, 16b.

Alternatively the medium-range wireless communication systems 28a, 28b may communicate via Near-Field Magnetic Induction once the medium-range wireless communication systems 28a, 28b are synched, the close-range communication systems 24a, 24b may be shut off to minimize power consumption and prevent from security breach.

Once identifiers exchange is performed by the close-range communication systems 24a, 24b, each of the temple's electronic device 18a, 18b stores the identifier of the other temple's close-range communication systems 24a, 24b into an internal memory storage for the next time the electronic devices 18a, 18b are switched on. Master and slave roles are then defined over both electronic devices 18a, 18b. The exchanged identifier may be the MAC addresses of the electronic devices 18a, 18, the close-range communication devices 24a, 24b or the medium-range communication devices 28a, 28b. The master starts advertising and slave scans and connects to the specified master identifier. Then, when both medium-range wireless communication systems 28a, 28b are synchronized, the close-range communication systems 24a, 24b are powered down to prevent overconsumption, malfunctioning and security breach. A signal over the frame is provided to the user to confirm the frame is functioning.

Once the first and second electronic devices 18a, 18b are synchronized, the next time the eyewear frame 10 is switched on, the eyewear frame usage is free of temples 16a, 16b synchronization. Upon synchronization of the first and second electronic devices 18a, 18b, the master and slave roles are defined for each of the first and second electronic devices 18a, 18b.

The active communication between both medium-range wireless communication systems 28a, 28b into the temples 16a, 16b may be used for defining the state of their ecosystem such as remaining autonomy of the batteries 20a, 20b, the batteries 20a, 20b charging status, the eyewear frame 10 on/off status, or exchange of data related to their sensors, or related to their actuators.

In an embodiment, the embedded electronic devices 18a, 18b drive a binocular optical system comprising two electronically controlled optical lenses, for example tinted optical lenses. Both optical lenses may need to be controlled in a synchronized manner. So almost real time data exchange over both embedded electronic devices 18a, 18b is preferable to increase visual comfort for the wearer.

The invention has been described above with the aid of embodiments without limitation of the general inventive concept. Many further modifications and variations will be apparent to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. An eyewear frame comprising:
a central portion configured to receive at least one optical lens,
a first temple having a first embedded electronic device and a first battery,
a second temple having a second embedded electronic device and a second battery,
the first temple is pivotally fixed to a first end of the central portion and the second temple is pivotally fixed to a second end of the central portion,
wherein the first embedded electronic device and the second embedded electronic device are configured to communicate in a wireless manner, and
the first embedded electronic device and the second embedded electronic device comprise each a close-range communication system configured to synchronize the first and the second electronic devices,
wherein the close-range communication systems are configured to allow communications when said communications systems are in contact or quasi-contact, wherein quasi-contact is a separation of a distance of less than 5 mm.

2. The eyewear frame according to claim 1, wherein the close-range communication systems are radio frequency-based communication systems.

3. The eyewear frame according to claim 1, wherein the respective embedded electronic device's synchronization, via the close-range communication systems, is based on the first and second electronic device's identities.

4. The eyewear frame according to claim 1, wherein the first embedded electronic device and the second embedded electronic device further comprise respectively a medium-range wireless communication system.

5. The eyewear frame according to claim 4, wherein the medium-range wireless communication systems comprise each Near-Field Magnetic Induction Communication or radio frequency communication.

6. The eyewear frame according to claim 4, wherein the close-range communication systems are configured:

to pair the first embedded electronic device and the second embedded electronic device, and to define among the first embedded electronic device or the second embedded electronic device a master and a slave used for the medium-range wireless communication systems.

7. The eyewear frame according to claim 1, wherein the eyewear frame comprises a communication activation device configured to activate the close-range communication systems.

8. The eyewear frame according to claim 7, wherein the communication activation device comprises at least one motion sensor, the motion sensor is configured to activate close-range radio frequency-based communication systems upon detection of a specific motion pattern.

9. The eyewear frame according to claim 7, wherein the communication activation device comprises at least one battery sensor, the battery sensor is configured to activate close-range radio frequency-based communication systems upon detection of a charge of at least one, or both, of the first and second batteries.

10. The eyewear frame according to claim 7, wherein the communication activation device comprises at least one capacitive or physical button, the capacitive or physical button is configured to activate close-range radio frequency-based communication systems upon contact of the capacitive button or pressure of the physical button.

11. Eyewear for synchronizing embedded electronic devices of an eyewear frame comprising:

a central portion configured to receive at least one optical lens, a first temple having a first embedded electronic device and a first battery, a second temple having a second embedded electronic device and a second battery, the first temple is pivotably fixed to a first end of the central portion and second temple is pivotably fixed to a second end of the central portion, the first embedded electronic device and the second embedded electronic device are configured to communicate in a wireless manner, the first embedded electronic device and the second embedded electronic device comprise each a close-range communication system, wherein the eyewear is configured to perform:

activating the close-range communication systems, exchanging identifiers of the first electronic device and the second electronic devices via the close-range communication systems, and synchronizing the first electronic device and the second electronic device, wherein the close-range communication systems are configured to allow communications when said communications systems are in contact or quasi-contact, wherein quasi-contact is a separation of a distance of less than 5 mm.

12. The eyewear according to claim 11, wherein activating the close-range communication systems is caused at least by the detection of a motion pattern by a motion sensor.

13. The eyewear according to claim 11, wherein activating the close-range communication systems is caused at least by a detection of the charge of the first battery and/or the second battery.

14. The eyewear according to claim 11, wherein activating the close-range communication systems is caused at least by the contact of a capacitive button or the pressure of a physical button or the sensing of a magnet element.

15. The eyewear according to claim 11, wherein upon synchronizing the first embedded electronic device and the second embedded electronic device, the eyewear is configured to further perform defining among the first electronic device or the second electronic devices a master and a slave.

* * * * *